(12) United States Patent
Leppänen et al.

(10) Patent No.: US 6,333,001 B1
(45) Date of Patent: Dec. 25, 2001

(54) MICRO-ALLOYED STEEL ROLLING BEARINGS

(75) Inventors: Rainer R. Leppänen, Hällefors (SE); John Beswick, Montfoort (NL)

(73) Assignee: Ovaka Steel, Hallefors (SE)

( * ) Notice: Subject to any disclaimer, the term of this patent is extended or adjusted under 35 U.S.C. 154(b) by 0 days.

(21) Appl. No.: 09/069,172

(22) Filed: Apr. 29, 1998

(30) Foreign Application Priority Data

Apr. 4, 1997 (SE) ................................ 9701592

(51) Int. Cl.$^7$ ............................ C22C 38/12; C22C 38/04
(52) U.S. Cl. ..................... 420/127; 148/906; 148/320; 384/492; 384/912
(58) Field of Search ................... 148/906, 320; 420/127; 384/492, 912

(56) References Cited

U.S. PATENT DOCUMENTS 5,565,044 * 10/1996 Kim et al. ............................ 148/320
5,725,690 * 3/1998 Ochi et al. ........................... 148/906

FOREIGN PATENT DOCUMENTS

| | | |
|---|---|---|
| 38 04 654 | 8/1989 | (DE) . |
| 0 718 513 | 6/1996 | (EP) . |
| 801215 | 9/1958 | (GB) . |
| 939616 | 10/1963 | (GB) . |

OTHER PUBLICATIONS

H. R. Lin et al., "The Prediction of Precipitation Strengthening in Microalloyed Steels," *Metallurgical Transactions A,* vol. 19A, No. 6, ISSN 0360–2133, Jun. 1998, pp. 1471–1480.

Patent Abstract of Japan, vol. 095, No. 009, JP 07 150235, Jun. 13, 1995.

Patent Abstracts of Japan, vol. 012, No. 050, JP 62 196323, Aug. 29, 1987.

* cited by examiner

*Primary Examiner*—Deborah Yee
(74) *Attorney, Agent, or Firm*—Burns, Doane, Swecker & Mathis, L.L.P.

(57) ABSTRACT

A micro-alloyed steel for rolling bearings and especially for HBU/THU forgings with improved yield strength in "as forged condition. The steel has the following composition 0.5–0.7% C, 0–0.6% Si, 0.4–1.2% Mn, 0–0.035% S, 0.05–2.0% V, 80–160 ppm N, the remainder iron and ordinary impurities.

8 Claims, No Drawings

MICRO-ALLOYED STEEL ROLLING BEARINGS

BACKGROUND OF THE INVENTION

The performance and reliability of rolling bearings are determined to a large degree by the materials from which the bearing components are made. Steels used for rolling bearings must be capable of being adequately hardened and must have high fatigue strength and wear resistance. Also, the structural and dimensional stability of the bearing components must be satisfactory at the operating temperatures that can be expected.

In so-called hub bearing units (HBU) for cars and truck hub units (THU), the hub forms a bearing race for the rolling elements. For such HBU/THU forgings, a steel grade named SAE 1055 is commonly used. The composition of this steel grade is the following: 0.50–0.60% C, 0.60–0.90% Mn, 0.050% S max and 0.040% P max. The rest is iron and ordinary impurities. The bearing race is commonly induction hardened.

OBJECTS AND SUMMARY OF THE INVENTION

It is an object of this invention to avoid or alleviate the problems of the prior art.

It is further an object of this invention to provide a micro-alloyed steel for rolling bearings especially for HBU/THU forgings with improved strength.

It is an aspect of the invention to provide a new steel grade for rolling bearings and especially for forged HBU/THU with improved yield strength in "as forged" condition which will result in improved performance, such as an improved fatigue strength and resistance to axial clearance, and/or create the possibility for downsizing of the HBU/THU (weight reduction). The surface hardness after induction hardening should be sufficient for the above applications. These objects have been achieved by a micro-alloyed steel having the following composition:

0.5–0.7% C, 0–0.6% Si, 0.4–1.2% Mn, 0–0.035% S, 0.05–0.2% V, 80–160 ppm N, and the remainder iron and ordinary impurities.

DETAILED DESCRIPTION OF THE PREFERRED EMBODIMENTS OF THE INVENTION

The alloy of the presently claimed invention comprises: 0.5–0.7% C, 0–0.6% Si, 0.4–1.2% Mn, 0–0.035% S, 0.05–0.2% V, 80–160 ppm N, and the remainder iron and ordinary impurities. Among the main differences between the steel grade according to the presently claimed invention and the SAE 1055 are the relatively small addition of vanadium (V) and a controlled content of nitrogen. A significant increase in the yield strength has been obtained with such addition.

The invention is additionally illustrated in connection with the following Example which is to be considered as illustrative of the present invention. It should be understood, however, that the invention is not limited to the specific details of the Example.

EXAMPLE

In the tests the following materials were used:
HBU inner ring forgings made of a vanadium micro-alloyed steel according to the present invention. This material will be referred to as 1055V.
HBU IR forgings made from SAE 1055 (reference).
The chemical composition of the materials is shown in Table 1 below.

TABLE 1

Chemical Composition of the Alloys

| Chemical Component | 1055V | 1055 |
|---|---|---|
| C (%) | 0.58 | 0.568 |
| Al (%) | 0.03 | 0.0213 |
| Si (%) | 0.16 | 0.192 |
| P (%) | 0.005 | 0.0091 |
| S (%) | 0.022 | 0.0206 |
| V (%) | 0.102 | 0.001 |
| Mn (%) | 0.66 | 0.711 |
| Cr (%) | 0.11 | 0.118 |
| Ni (%) | 0.08 | 0.102 |
| Cu (%) | 0.17 | 0.132 |
| Mo (%) | 0.019 | 0.035 |
| N (ppm) | 100 | — |

In order to obtain an insight in the material properties of the steel in HBU/THU-applications, metallographic examinations and number of material tests were performed.

The flange corners of the HBU/THU are the most critical area of the components and therefore the machining of the microtensil test pieces was done from this area. Tensile tests were performed on test pieces machined from inner ring forgings of the two materials. The test pieces were machined from the area close to the flange corner of the hub in the longitudinal and perpendicular direction. The tensile properties were tested according to normal room temperature tension test procedure. The tensile test results of this material test are given in Table 2 below.

TABLE 2

Tensile properties

| Material | Ultimate Tensile Strength (MPa) | 0.2% Yield (MPa) |
|---|---|---|
| 1055V | 932 | 560 |
| 1055 | 837 | 433 |

The tensile testings of the HBU forgings showed a significant increase in the yield strength and the ultimate tensile strength for the vanadium micro-alloyed steel 1055V, as compared to the reference material 1055. The tensile strength in the flange corner area of the forgings was almost 30% higher.

The fatigue strength of the micro-alloyed steel was determined by means of rotational bending. The results of the rotational bending fatigue test showed that the fatigue limit at $5.10^6$ revolutions was 375 MPa. This is an increase of 34% relative to the values for standard 1055. The fracture surfaces of the test pieces showed that all fractures were initiated in the typical way for rotational bending fatigue (fatigue initiation at inclusions near the surface).

Torsional fatigue testing was performed on test pieces machined from a 65 mm bar. The torsional fatigue testing was determined following the staircase method at 15 Hz, up to suspension at $5.10^6$ cycles. The Wohler curve for the high level strength was determined on 20 test pieces.

The torsional L50 fatigue limit of the 1055V micro-alloyed steel expressed as L50 was 242 MPa. The test showed that the vanadium micro-alloying had a significant influence on the fatigue strength of the steel. The test results are given in Table 3 below.

TABLE 3

Comparison of properties (MPa)

| | 0.2% yield | Rotational Bending Fatigue Limit | Torsion L50 |
|---|---|---|---|
| 1055 | 389 | 293 | 150 |
| 1055V | 560 | 375 | 242 |

Further tests showed that the micro-alloyed 1055V had the same tolerance to defects under conditions of cyclic stressing as the 1055 in the "as forged" condition.

Impact properties were measured on blunt notch impact test pieces. The average load at peak was almost 32 kN and the absorbed energy was 67.2 joule. This was in increase of 26% compared to the impact properties of the reference alloy 1055.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A hub bearing unit comprising at least one component made from steel having a composition consisting essentially of:

0.7%≧C>0.50%
0–0.6% Si
0.4–1.2% Mn
0–0.035% S
0.05–0.2% V
80–160 ppm N and
the remainder iron and ordinary impurities;
wherein said steel has a 0.2 % yield strength of at least appoximately 560 MPa.

2. A tapered hub bearing unit comprising at least one component made from steel having a composition consisting essentially of:

0.7%≧C>0.50%
0–0.6% Si
0.4–1.2% Mn
0–0.035% S
0.05–0.2% V
80–160 ppm N and
the remainder iron and ordinary impurities;
wherein said steel has a 0.2 % yield strength of at least approximately 560 MPa.

3. The at least one component of claim 1, wherein said steel has an ultimate tensile strength of at least approximately 932 MPa.

4. The at least one component of claim 1, wherein said steel has a fatigue limit at $5.10^6$ revolutions of at least approximately 375 MPa.

5. The at least one component of claim 1, wherein said steel has a L50 torsional fatigue limit of at least approximately 242 MPa.

6. The at least one component of claim 2, wherein said steel has an ultimate tensile strength of at least approximately 375 MPa.

7. The at least one component of claim 2, wherein said steel has a fatigue limit at $5.10^6$ revolutions of at least approximately 375 MPa.

8. The at least one component of claim 2, wherein said steel has an L50 torsional fatigue limit of at least approximately 242 MPa.

* * * * *

UNITED STATES PATENT AND TRADEMARK OFFICE
CERTIFICATE OF CORRECTION

PATENT NO. : 6,333,001 B1
DATED : December 25, 2001
INVENTOR(S) : Rainer R. Leppanen et al.

It is certified that error appears in the above-identified patent and that said Letters Patent is hereby corrected as shown below:

<u>Title page, Item [54], and Column 1, lines 1-2,</u>
Title, change "MICRO-ALLOYED STEEL ROLLING BEARINGS" to
-- MICRO-ALLOYED STEEL FOR ROLLING BEARINGS --.
Item [73], Assignee, change "Ovaka Steel" to -- Ovako Steel --.
Item [30], Foreign Application Priority Data, change "Apr. 4, 1997" to -- Apr. 29, 1997 --.
ABSTRACT, lines 2-3, change "yield strength in "as forged condition." to
-- yield strength in the "as forged" condition. --.

Signed and Sealed this

Ninth Day of July, 2002

*Attest:*

*Attesting Officer*

JAMES E. ROGAN
*Director of the United States Patent and Trademark Office*